(12) United States Patent
Rothuizen et al.

(10) Patent No.: US 12,315,537 B2
(45) Date of Patent: May 27, 2025

(54) MAGNETIC WRITE TRANSDUCER WITH VARIABLE WRITE GAP LENGTH

(71) Applicant: International Business Machines Corporation, Armonk, NY (US)

(72) Inventors: Hugo E. Rothuizen, Oberrieden (CH); Mark Alfred Lantz, Adliswil (CH); Jason Liang, Campbell, CA (US); Icko E. T. Iben, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/048,647

(22) Filed: Oct. 21, 2022

(65) Prior Publication Data

US 2024/0135963 A1 Apr. 25, 2024
US 2024/0233756 A9 Jul. 11, 2024

(51) Int. Cl.
  *G11B 5/31* (2006.01)
  *G11B 5/127* (2006.01)
  *G11B 5/187* (2006.01)
  *G11B 5/23* (2006.01)

(52) U.S. Cl.
  CPC .......... *G11B 5/3116* (2013.01); *G11B 5/1278* (2013.01); *G11B 5/187* (2013.01); *G11B 5/23* (2013.01); *G11B 5/232* (2013.01)

(58) Field of Classification Search
  None
  See application file for complete search history.

(56) References Cited

U.S. PATENT DOCUMENTS

| | | | | |
|---|---|---|---|---|
| 5,673,163 A | * | 9/1997 | Cohen | G11B 5/3116 |
| | | | | 360/125.51 |
| 5,734,533 A | * | 3/1998 | Nepela | G11B 5/232 |
| | | | | 360/119.12 |
| 6,826,011 B1 | * | 11/2004 | Haftek | G11B 5/23 |
| | | | | 360/119.11 |
| 7,436,628 B2 | * | 10/2008 | Kameda et al. | G11B 5/1278 |
| | | | | 360/125.1 |

(Continued)

FOREIGN PATENT DOCUMENTS

| | | |
|---|---|---|
| CN | 102016986 A | 4/2011 |
| GB | 2508387 A | 6/2014 |
| JP | 61240413 A * 10/1986 | ............... G11B 5/23 |

OTHER PUBLICATIONS

Salo, et al., "The Structure of Shingled Magnetic Recording Tracks", IEEE Transactions on Magnetics, vol. 50, No. 3, Mar. 2014, 6 pages, <https://ieeexplore.ieee.org/document/6774982>.

(Continued)

*Primary Examiner* — Craig A. Renner
(74) *Attorney, Agent, or Firm* — Joseph P. Curcuru

(57) ABSTRACT

In an approach to improve write transducers a write transducer for recording data on a magnetic media is disclosed. The write transducer comprises a first pole piece. The write transducer further comprises a second pole piece. The first pole piece and the second pole piece are arranged in such a way, that a write gap is formed between the first pole piece and the second pole piece. A longitudinal axis is defined between opposite ends of the write gap. A length of the write gap along the longitudinal axis varies in the direction transverse to the longitudinal axis.

16 Claims, 8 Drawing Sheets

(56) References Cited

U.S. PATENT DOCUMENTS

| | | | | |
|---|---|---|---|---|
| 7,869,160 B1* | 1/2011 | Pan et al. | ............... | G11B 5/3116 |
| | | | | 360/122 |
| 8,189,294 B2* | 5/2012 | Edelman et al. | ..... | G11B 5/1278 |
| | | | | 360/125.3 |
| 8,223,458 B2* | 7/2012 | Mochizuki et al. | .. | G11B 5/3116 |
| | | | | 360/125.1 |
| 8,351,156 B2* | 1/2013 | Kudo et al. | ........... | G11B 5/3116 |
| | | | | 360/125.13 |
| 8,542,463 B2* | 9/2013 | Guan | ................... | G11B 5/1278 |
| | | | | 360/119.04 |
| 8,582,235 B2 | 11/2013 | Jubert et al. | | |
| 8,619,391 B2 | 12/2013 | Hsu et al. | | |
| 8,824,101 B2* | 9/2014 | Edelman | .............. | G11B 5/1278 |
| | | | | 360/125.13 |
| 9,082,425 B2* | 7/2015 | Lopusnik et al. | ...... | G11B 5/315 |
| 9,129,614 B2 | 9/2015 | Biskeborn et al. | | |
| 9,153,255 B1 | 10/2015 | Yi et al. | | |
| 9,349,389 B2* | 5/2016 | Takagishi et al. | .... | G11B 5/3116 |
| 2005/0068671 A1 | 3/2005 | Hsu et al. | | |
| 2009/0279202 A1 | 11/2009 | Cherubini et al. | | |
| 2011/0222187 A1 | 9/2011 | Biskeborn | | |
| 2015/0332711 A1 | 11/2015 | Urakami et al. | | |

OTHER PUBLICATIONS

International Search Report and the Written Opinion, International Application No. PCT/CN2023/107888, Oct. 17, 2023, 7 pages.

\* cited by examiner

MAGNETIC WRITE TRANSDUCER WITH VARIABLE WRITE GAP LENGTH

BACKGROUND OF THE INVENTION

The present invention relates generally to magnetic data storage systems, and more particularly, the present invention relates to a magnetic transducer for recording data, respectively linear tracks of data on a magnetic media with which spatial fluctuations of the magnetic imprint produced on the media can be reduced.

In magnetic storage systems, data is read from and written onto a magnetic recording media utilizing magnetic transducers. Data can be written on the magnetic recording media, in particular a magnetic tape, by moving a magnetic recording transducer included in a write transducer, for example a gapped electromagnet based on ferromagnetic yokes and poles, to a position over the media where the data is to be stored. The magnetic recording transducer then generates a magnetic field, which encodes the data into the magnetic media. Data is read from the media by similarly positioning a magnetic read transducer, for example a magnetoresistive element, and then sensing the magnetic field of the magnetic media. Read and write operations may be independently synchronized with movement of the media to ensure that the data can be read from and written to the desired location on the media.

In the case of magnetic tape systems, high data throughput rates are commonly achieved by operating a large number of transducers simultaneously, wherein the transducers are embedded within a body constituting a head, flush with the head's tape-bearing surface, and dispositioned in a regularly-pitch array along a direction substantially perpendicular to the relative direction of motion of the tape over the head, giving rise to parallel, non-overlapping, tracks of written data along the length of tape. Assuming the write transducer is a ring-type gapped electromagnet, a longitudinal axis for the transducers is defined by the shortest distance between the two pole pieces on either side of the gap. The set of transducers is usually arrayed along a transverse direction, which is defined perpendicular to in the tape-bearing surface.

SUMMARY

According to one embodiment of the invention, a magnetic write transducer for recording data on a magnetic media is provided. The write transducer comprises a first pole piece. The write transducer further comprises a second pole piece, wherein the first pole piece and the second pole piece are arranged in such a way that a write gap is formed between the first pole piece and the second pole piece. A longitudinal axis is defined between opposite ends of the write gap. A length of the write gap along the longitudinal axis varies in a direction transverse to the longitudinal axis.

According to a further embodiment of the invention, a longitudinal magnetic recording system for recording data on a magnetic media is provided. The longitudinal magnetic recording system comprises a magnetic media and at least one magnetic write transducer for recording data on the magnetic media. The at least one magnetic write transducer comprises a first pole piece. The at least one magnetic write transducer further comprises a second pole piece. The first pole piece and the second pole piece are arranged in such a way that a write gap is formed between the first pole piece and the second pole piece. A longitudinal axis is defined between opposite ends of the write gap. The length of the write gap along the longitudinal axis varies in a direction transverse to the longitudinal axis.

BRIEF DESCRIPTION OF THE DRAWINGS

The following description is made for the purpose of illustrating the general principles of the present invention and is not meant to limit the inventive concepts claimed herein. Further, particular features described herein can be used in combination with other described features in each of the various possible combinations and permutations.

DETAILED DESCRIPTION

Figure 1:
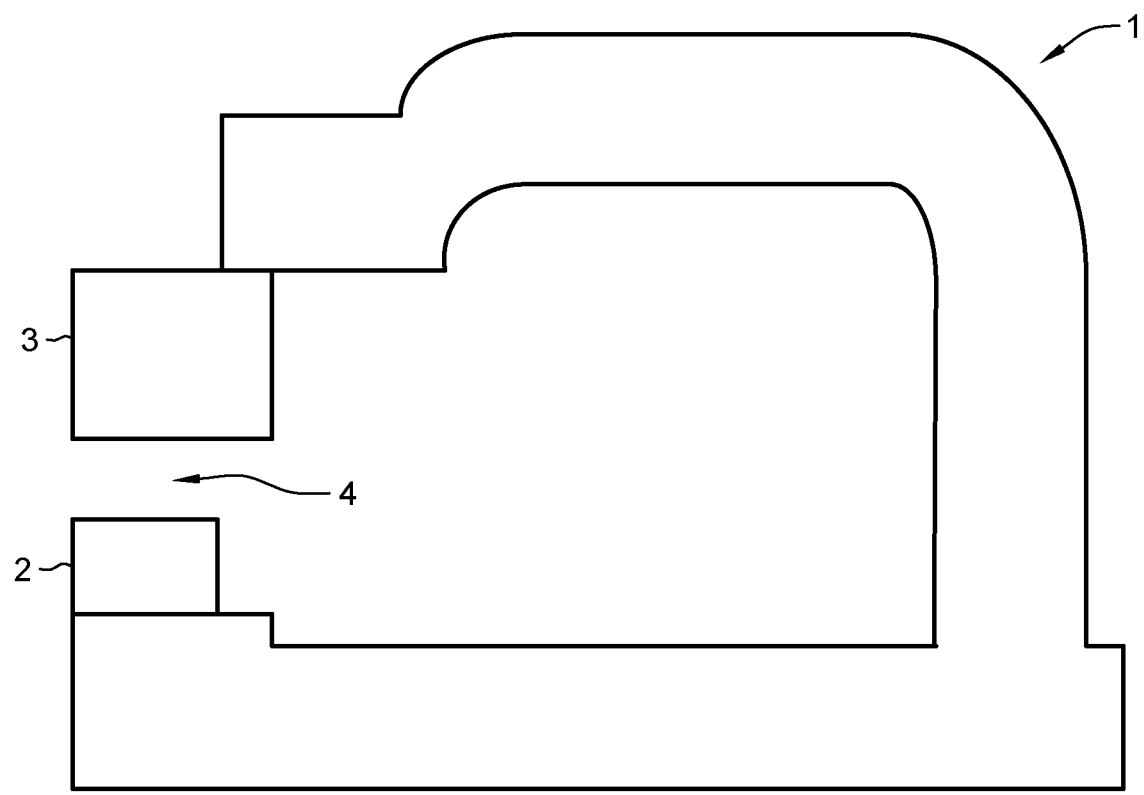
FIG. 1 illustrates a cross-section view of a magnetic write transducer of a magnetic longitudinal magnetic recording system for recording data on a magnetic media according to one embodiment.

Embodiments of the present invention recognize that the quantity of data stored on a magnetic tape may be increased by increasing the number of data tracks across the tape. More tracks are made possible by reducing feature sizes of the readers and writers, such as by using thin-film fabrication techniques and magnetoresistive (MR) sensors. However, for various reasons, embodiments of the present invention recognize that the feature sizes of readers and writers cannot be arbitrarily reduced, and so factors such as lateral tape motion transients and tape lateral expansion and contraction must be balanced with reader/writer sizes that provide acceptable written tracks and readback signals. Embodiments of the present invention recognize that one issue limiting areal density is misregistration caused by tape lateral expansion and contraction. Tape width can for example vary by up to about 0.1% due to expansion and contraction caused by changes in humidity, tape tension, temperature, aging, etc. This is often referred to as tape dimensional stability (TDS), or more properly, tape dimensional instability (TDI).

Embodiments of the present invention recognize that if the tape is written in one environment and then read back in another, the tape dimension instability may prevent the spacing of the tracks on the tape from precisely matching the spacing of the reading elements during readback. Embodiments of the present invention recognize that, in recent products, the change in track spacing due to tape dimensional instability is small compared to the size of the written tracks and is part of the tracking budget that is considered when designing a product. As the tape capacity increases over time, tracks are becoming smaller and tape dimension instability is becoming an increasingly larger portion of the tracking budget and this is a limiting factor for growing areal density.

Embodiments of the present invention recognize that to address tape dimension instability, a process called skew-based TDS compensation has been developed, wherein a targeted nominal operating pitch for transducers for reading and/or writing to a magnetic tape is determined. The write head comprising the array of write transducers is oriented such that its longitudinal axis forms an angle relative to the direction of motion of tape to achieve the desired pitch when projected onto the across-tape direction, the angle usually being between greater than 0.2° and about 15°. Embodiments of the present invention recognize that during operation, this angle can be dynamically adjusted to change the effective pitch between transducers to match the pitch of track locations on the tape in response to changes in the width of the tape due to TDS.

Embodiments of the present invention recognize that to ensure the reliability of the recorded data, tape systems employ a process called read-while-write verification in which a set of read transducers is positioned immediately downstream of the set of writer transducers. As the tape is streamed over the recording head, data is written first by the write transducers and then read back when the written data passes over the read transducers and verified to be correctly written. Embodiments of the present invention recognize that in order for this process to function over the range of angles applied to compensate for TDS during operation, the write transducers need to be relatively wide compared to the width of the read transducer, to ensure that the reader is always positioned above some portion of the written track, even if the angle of the head needs to be adjusted. To increase the track density that can be achieved with such wide writers a process called shingling is used. In this process, a track is first written with a width that corresponds to the width of the write transducer. Embodiments of the present invention recognize that to write the neighboring track that is adjacent to this first track, the transverse position of the head is adjusted by a distance smaller than or equal to the width of the write transducer and equal to the desired track pitch, in example partially overlapping with the first track. When the neighboring track is written it partially overwrites the initial track leaving a remanent or shingled track at the target track pitch. Each subsequent track partially overlaps and partially overwrites the previous track. Embodiments of the present invention recognize that with this process it is desirable that the shingled portion of the track have a high quality, whereas the portion of the track which is subsequently overwritten can have a lower quality as long as it is still sufficient for the read-while-write verification process.

Embodiments of the present invention recognize that longitudinal magnetic recording systems for recording data on a magnetic tape usually comprise a magnetic media, for example a longitudinal magnetic recording media having a magnetic layer formed on a substrate via a multi-layered underlayer, a magnetic recording head including a magnetic write transducer section and a read-back transducer section, a device for causing the head to move longitudinally relative to the magnetic recording media, and a read/write signal processor used as a means for processing signals input to the magnetic write transducer and output signals received from the read-back section of the head.

Embodiments of the present invention recognize that a magnetic write transducer can include at least one coil. A magnetic field is generated when current passes through the at least one coil, depending on the direction of the current. To write data to the magnetic media, the direction of the magnetic field is alternated between two directions by alternating the polarity of the current in the at least one coil, wherein different bits can be created by reversing the polarity of the at least one coil.

Embodiments of the present invention recognize that during shingling, write transducers with wide write gaps often display spatial fluctuations, in the cross-track direction, of the magnitude of the magnetic field they produce during writing. These fluctuations can deteriorate the quality of the recorded data, conferring random dips or edge-of-track droop to the readback signal-to-noise ratio at corresponding locations across the width of a written track. Their impact on the recording signal-to-noise ratio is in general larger near lateral edges of a magnetic write transducer, when the magnetic write transducer is wide in the cross-track direction and when the write gap length is large. In shingled writing only a small edge portion of the recording transducer is actually used to record the data which will be retained after shingling, wherein this edge portion is also the region of the magnetic write transducer which is usually most affected by fluctuations.

Examples described herein may have the technical benefit that, by varying the length of the write gap of the magnetic write transducer in its cross-track direction, the distribution of the signal-to-noise ratio yield of the recording transducer may be tightened while also a much greater operable length of the write gap in its cross-track direction may be retained for read back respectively for the purpose of write verification. Therein, the length of the write gap can vary in the direction transverse to the longitudinal axis of the write gap by at least than 10%. In particular, the length of the write gap can vary in the direction transverse to the longitudinal axis by 20 to 100% compared to the shortest length of the write gap.

Further, at least a portion of the write gap located at a lateral edge of the write transducer that is used to record the portion of the track that is retained after shingling can have the smallest length within the write gap. This example may have the technical benefit that flux through the pole pieces can be channeled at this edge region in order to better overcome hysteretic domain motion processes and thereby to promote a smoother, polarity-symmetric and more reproducible magnetic response during bipolar switching at this location. For wide-track writers, this feature in particular counteracts the tendency for the effective magnetic reluctance to vary in the lateral direction towards the edges, and to result statistically in a long-range droop of the write field strength towards the edges. In various embodiments, the smallest length may be a predetermined unit of measurement.

Therein, a width of the portion can be set based on a targeted operating track pitch. In particular, the length of the portion can correspond to between approximately one and five times the targeted operating track pitch. This example may have the technical benefit that the efficiency of the focusing effect and also the write current efficiency can be increased if the width proportion of a narrow gap region is as small as possible while also retaining the ability to record a high-quality track with sufficient width to meet system operating point requirements of the track pitch.

The write gap can be subdivided in the direction transverse to the longitudinal axis into at least two portions of constant length.

The length of the write gap can also vary continuously in the direction transverse to the longitudinal axis.

The write transducer can further be used for shingled writing and can have a tape bearing surface thereacross, wherein the longitudinal axis is rotated about a normal to the tape bearing surface to form an angle relative to an intended direction of travel of the magnetic media. Therein, the angle can be between greater than 0.2° and about 15°. Further, the write transducer can be used in a magnetic longitudinal recording system for recording data on a magnetic media.

FIG. 1 illustrates a magnetic write transducer 1 of a longitudinal magnetic recording system for recording data on a magnetic tape according to one example.

In the illustrated example, the write transducer 1 comprises a first pole piece 2 and a second pole piece 3. The first pole piece 2 and the second pole piece 3 are arranged in such a way, that a write gap 4 is formed between the first pole piece 2 and the second pole piece 3, wherein a longitudinal axis is defined between opposite ends of the write gap 4, and wherein a length of the write gap 4 along the longitudinal axis varies in a direction transverse to the longitudinal axis, respectively wherein the write gap 4 has a varying width in its cross-track direction. Therein, the first pole piece and the second pole piece can for example be connected to each other by a lower yoke, a back yoke and an upper yoke.

The first pole piece can further be a leading pole piece and the second pole piece can be a trailing pole piece. Alternatively, the first pole piece can be a trailing pole piece and the second pole piece can be a leading pole piece. The first pole piece can further have a first face respectively tape bearing surface and the second pole piece can further have a second face respectively tape bearing surface, wherein each of the first face and the second face is arranged to face the magnetic media in operation.

Here, that a longitudinal axis is defined between opposite ends of the write gap 4, wherein a length of the write gap 4 along the longitudinal axis varies in a direction transverse to the longitudinal axis, respectively that the write gap 4 has a varying length in its cross-track direction means that the write gap has a varying length in a direction that is perpendicular to a direction from the first face or the second face to the magnetic media, respectively in a direction transverse to a track direction in which data is written to the magnetic media by a corresponding longitudinal recording system.

Further, the expression longitudinal does not refer to the orientation of the media, and the magnetic media can have a longitudinal, perpendicular or random orientation.

Figure 2:
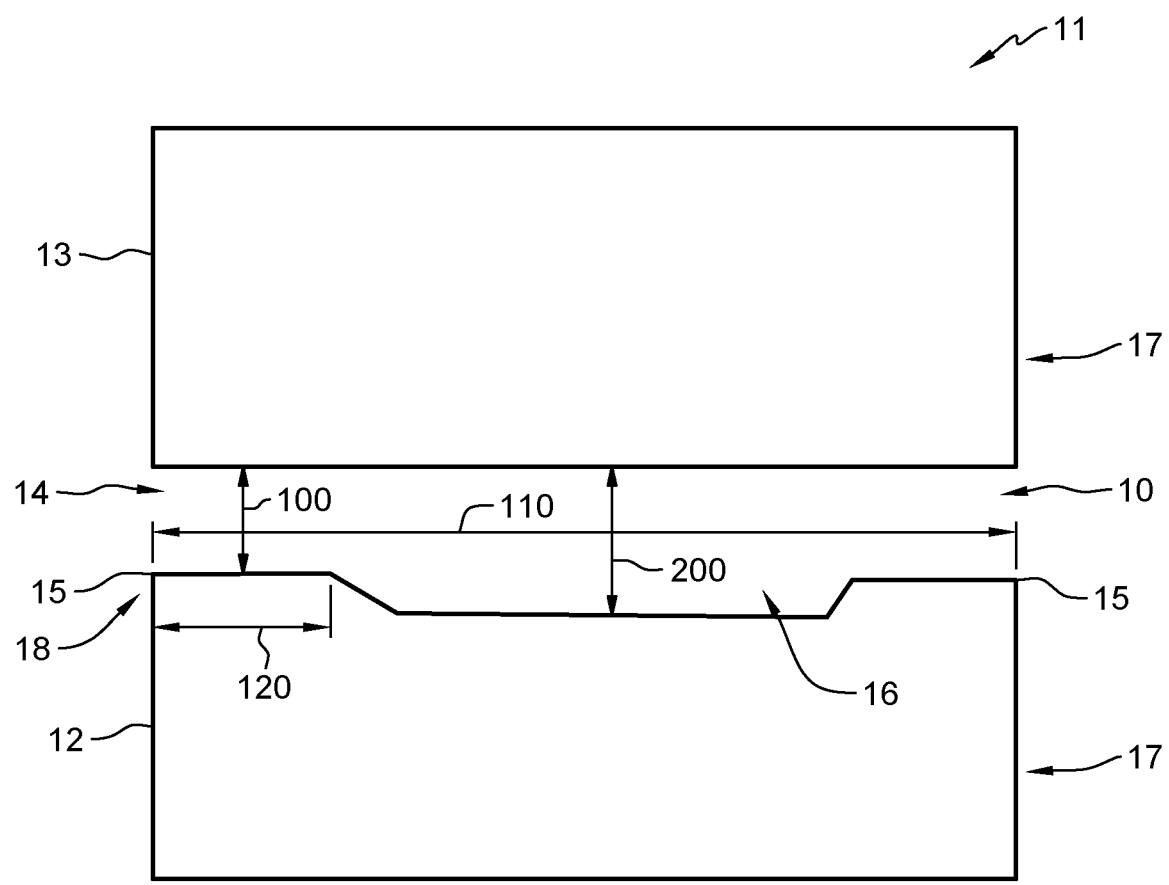
FIG. 2 illustrates a tape-facing view of a write gap of a magnetic write transducer of a longitudinal magnetic recording system for recording data on a magnetic media according to one embodiment.

FIG. 2 illustrates a write gap 10 of a magnetic write transducer 11 of a longitudinal magnetic recording system for recording data on a magnetic media according to one example.

In the illustrated example, the magnetic write transducer 11 comprises a first pole piece 12 and a second pole piece 13, wherein the write gap 10 is formed between the first pole piece 12 and the second pole piece 13, and wherein a longitudinal axis 110 is defined between opposite ends of the write gap 10, wherein a length of the write gap 10 along the longitudinal axis 110 varies in a direction transverse to the longitudinal axis.

According to the example shown in FIG. 2, the length of the write gap varies in the direction transverse to the longitudinal axis by at least 10%, and, more particularly, the length of the write gap varies in the direction transverse to the longitudinal axis by 10 to 50%, or 20 to 50%, in particular 20 to 100% compared to the longest length of the write gap.

As shown in FIG. 2, further at least a portion 14 of the write gap 10 at a lateral edge 15 of the write transducer 11 that is used to record the data has the smallest length 100 in the write gap 10, wherein the smallest length is a predetermined length that is less than any other length in the write gap. Further, a width 120 of the portion 14 is set based on a targeted operating track pitch. In particular, FIG. 2 shows a magnetic write transducer that has a region of a smaller write gap at a lateral shingling edge, this region beginning at the corner of the first pole piece 12 and spanning a width 120 commensurate with the targeted operating track pitch when recording data on a magnetic tape.

According to the example shown in FIG. 2, the width 120 of the portion corresponds to between approximately one and five times the targeted operating track pitch, and in particular two times the targeted operating track pitch. However, that the length of the portion corresponds to two times the targeted operating track pitch merely corresponds to a possible example, and the length of the portion can for example correspond to one time the targeted operating track pitch, too.

Further, the shown write gap 10 is subdivided in the direction transverse to the longitudinal axis into two portions of constant length and has at a first length 100 and a second length 200, wherein the first length 100 is different from the second length 200. In particular, according to the example shown in FIG. 2, the first pole piece 12 is designed in such a way, that a central portion 16 of the write gap 10 is widened in a stepwise fashion compared to the lateral edges 15 of the first pole piece 12.

Therein, the first pole piece can for example be formed respectively designed by inserting one photolithography process step and one subtractive process step into the usual process for fabricating the magnetic write transducer.

Further, the magnetic write transducer 11 can be used for shingled writing, wherein only the portion 14 of the magnetic write transducer 11 is used to record the data that is retained after shingling. Therein, the magnetic write transducer 11 has, respectively the first pole piece 12 and the second pole piece 13 have a tape bearing surface 17 having a first edge 18 oriented perpendicular to an intended direction of tape travel thereacross, wherein the longitudinal axis 110 is defined between opposite ends of the write gap 10, and wherein the longitudinal axis 110 is oriented at an angle relative to the first edge 18, respectively is rotated about a normal to the tape bearing surface to form an angle relative to an intended direction of travel of the magnetic media.

According to the example show in FIG. 2, the angle is between greater than 0.2° and about 15°.

Figure 3:
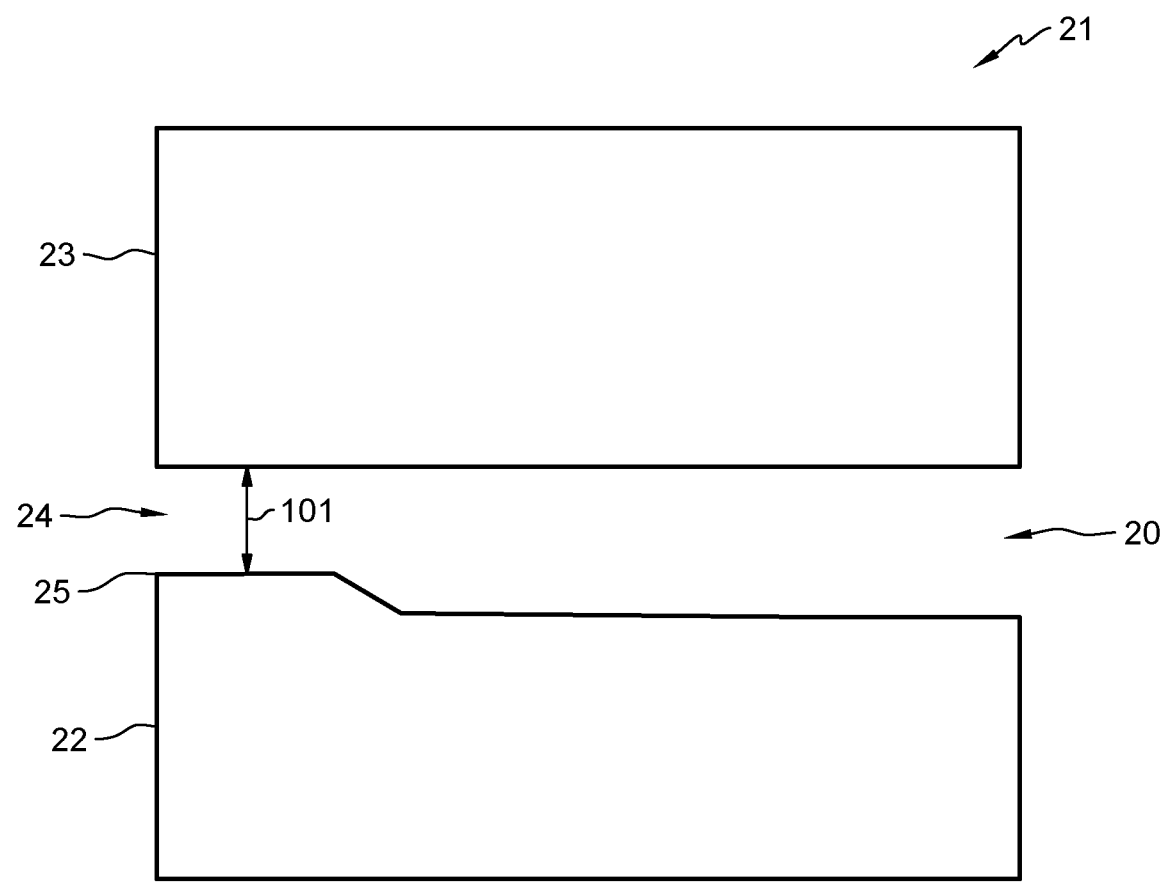
FIG. 3 illustrates a write gap of a magnetic write transducer of a longitudinal magnetic recording system for recording data on a magnetic media according to a further embodiment.

FIG. 3 illustrates a write gap 20 of a magnetic write transducer 21 of a longitudinal magnetic recording system for recording data on a magnetic media according to a further example.

In the illustrated example, the magnetic write transducer 21 again comprises a first pole piece 22 and a second pole piece 23, wherein the write gap 20 is formed between the first pole piece 22 and the second pole piece 23.

Also, a longitudinal axis is defined between opposite ends of the write gap 20, wherein a length of the write gap 20 along the longitudinal axis varies in a direction transverse to the longitudinal axis.

Further, a portion 24 of the write gap 20 at a lateral edge 25 of the write transducer 21 that is used to record the data that is retained after shingling has the smallest length 101 in the write gap 20.

The difference between the write gap 20 according to the example shown in FIG. 3 and the write gap 10 according to the example shown in FIG. 2 is that the corresponding narrow-gap region with length 101 is provided only on one side of the write transducer 21. According to the example shown in FIG. 3, the narrow-gap region is provided at a shingling edge of the write transducer.

Figure 4:
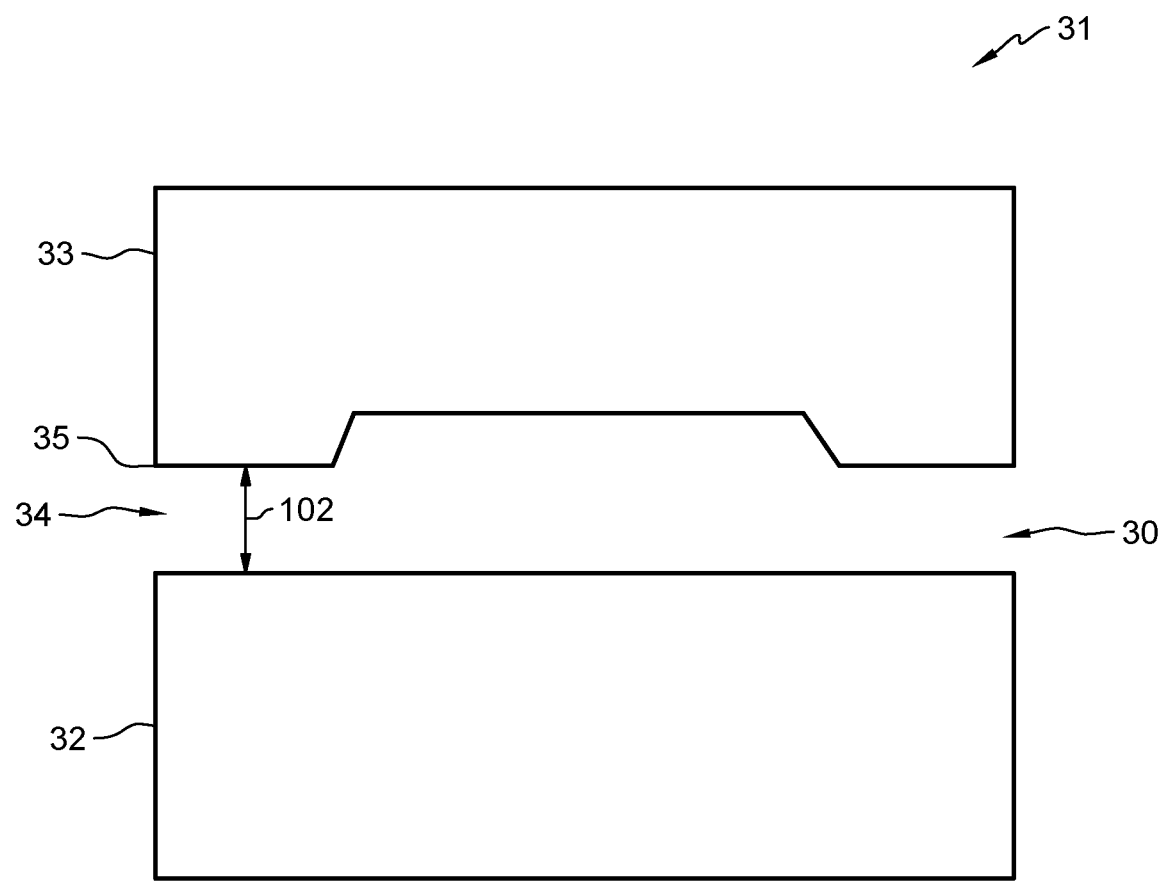
FIG. 4 illustrates a write gap of a magnetic write transducer of a longitudinal magnetic recording system for recording data on a magnetic media according to still a further embodiment.

FIG. 4 illustrates a write gap 30 of a magnetic write transducer 31 of a longitudinal magnetic recording system for recording data on a magnetic media according to still a further example.

In the illustrated example, the magnetic write transducer 31 comprises a first pole piece 32 and a second pole piece 33, wherein the write gap 30 is formed between the first pole piece 32 and the second pole piece 33.

Also, a longitudinal axis is defined between opposite ends of the write gap 30, wherein a length of the write gap 30 along the longitudinal axis varies in a direction transverse to the longitudinal axis.

Further, a portion 34 of the write gap 30 at a lateral edge 35 of the write transducer 31 that is used to record the data that is retained after shingling has the smallest length 102 in the write gap 30.

The difference between the write gap 30 according to the example shown in FIG. 4 and the write gap 10 according to the example shown in FIG. 2 is that according to the example shown in FIG. 4 the second pole piece 32 is designed respectively modified topographically to result in the desired variation of the write gap.

Figure 5:
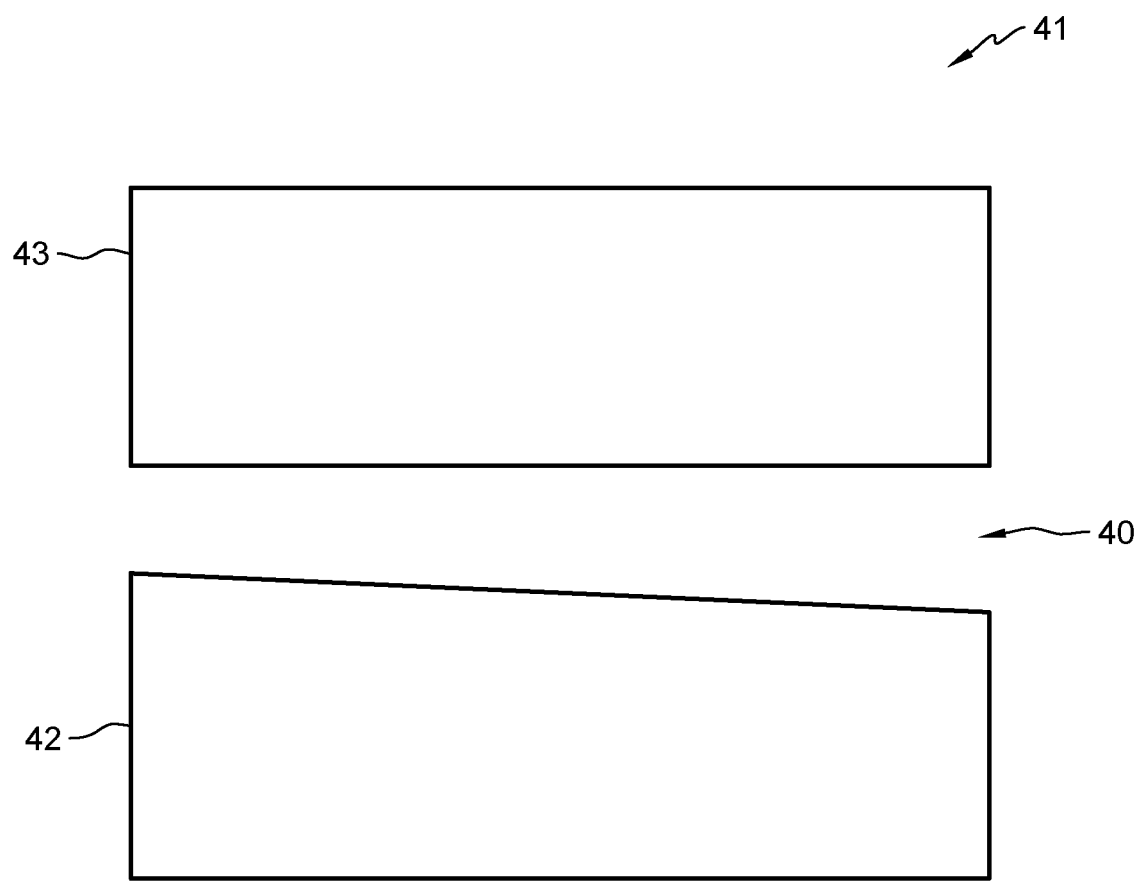
FIG. 5 illustrates a write gap of a magnetic write transducer of a longitudinal magnetic recording system for recording data on a magnetic media according to still a further embodiment.

FIG. 5 illustrates a write gap 40 of a magnetic write transducer 41 of a longitudinal magnetic recording system for recording data on a magnetic media according to still a further example.

In the illustrated example, the magnetic write transducer 41 again comprises a first pole piece 42 and a second pole piece 43, wherein the write gap 40 is formed between the first pole piece 42 and the second pole piece 43.

Therein, a longitudinal axis is defined between opposite ends of the write gap 40, wherein a length of the write gap 40 along the longitudinal axis varies in a direction transverse to the longitudinal axis.

As shown in FIG. 5, the length of the write gap 40 continuously decreases in the direction transverse to the longitudinal axis. In particular, the length of the write gap continuously and uniformly decreases over the full span respectively width of the magnetic write transducer 41 towards the shingling edge of the write transducer, so that the written track retained after shingling was written by the side of the writer with the narrowest write gap length.

Figure 6:
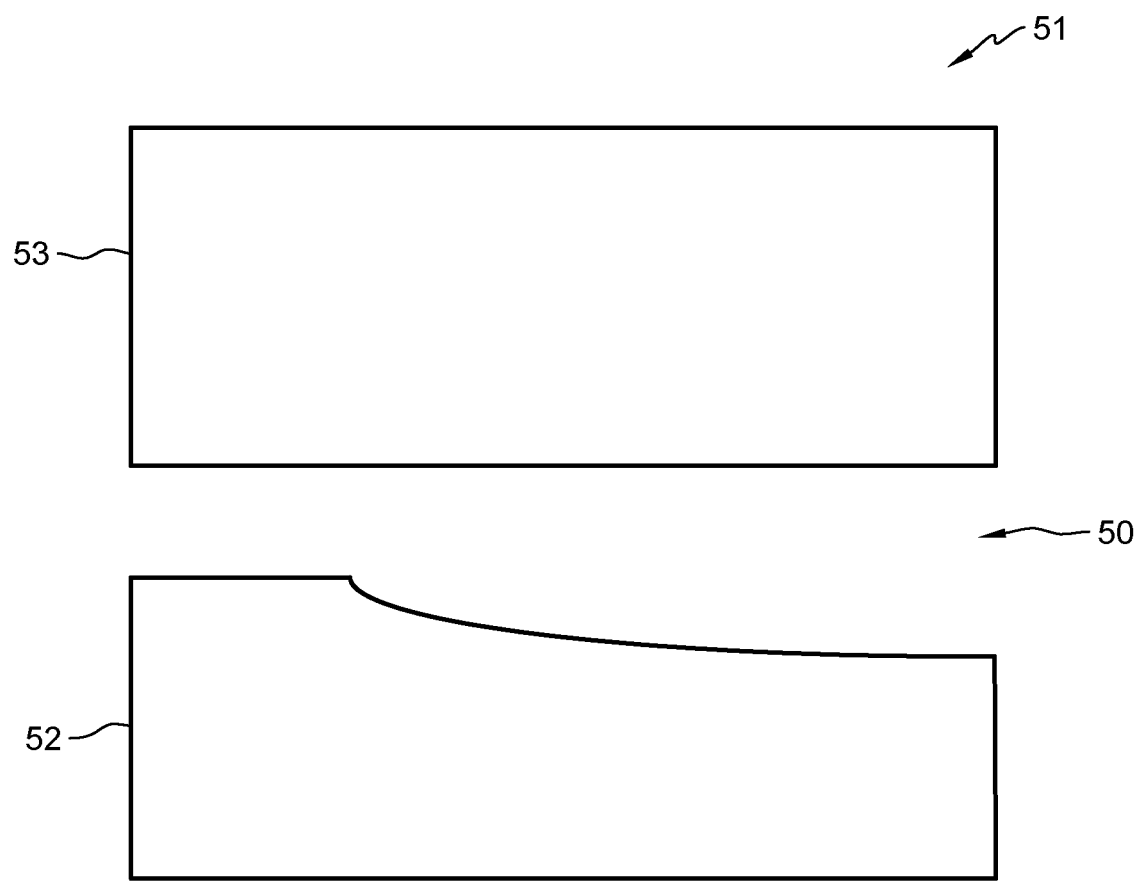
FIG. 6 illustrates a write gap of a magnetic write transducer of a longitudinal magnetic recording system for recording data on a magnetic media according to still a further embodiment.

FIG. 6 illustrates a write gap 50 of a magnetic write transducer 51 of a longitudinal recording system for recording data on a magnetic media according to still a further example.

In the illustrated example, the magnetic write transducer 51 again comprises a first pole piece 52 and a second pole piece 53, wherein the write gap 50 is formed between the first pole piece 52 and the second pole piece 53.

Also, a longitudinal axis is defined between opposite ends of the write gap 50, wherein a length of the write gap 50 along the longitudinal axis varies in a direction transverse to the longitudinal axis.

Further, the length of at least a portion of the write gap 50 in the direction transverse to the longitudinal axis continuously decreases.

The difference between the write gap 50 according to the example shown in FIG. 6 and the write gap 40 according to the example shown in FIG. 5 is that according to the example shown in FIG. 6 the length of the portion of the write gap 50 does not uniformly decrease and merely decreases in two portions towards the shingling edge of the write transducer.

Figure 7:
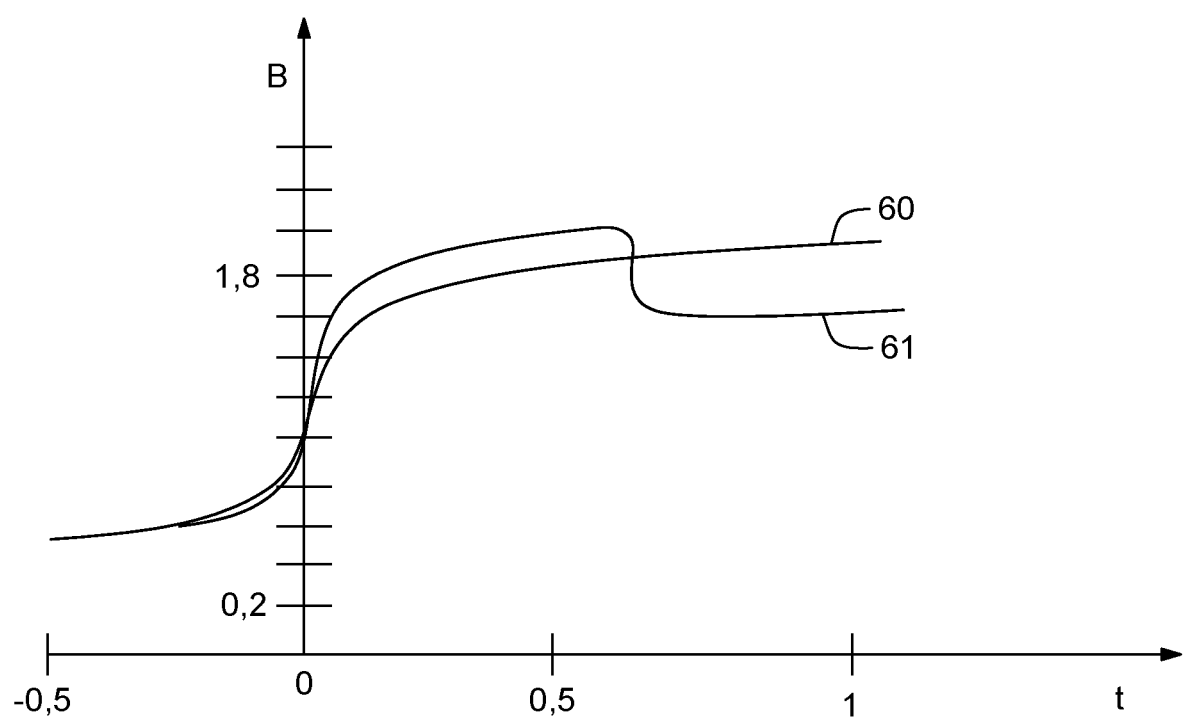
FIG. 7 illustrates the influence of the varying length of a write gap of a write transducer on magnetic flux densities according to one embodiment.

FIG. 7 illustrates the influence of the varying length of a write gap of a magnetic write transducer on magnetic flux densities according to one example.

In particular, FIG. 7 shows a diagram, wherein the abscissa-axis represents a lateral position along a write gap of a magnetic write transducer of a longitudinal magnetic recording system for recording data on a magnetic media relative to a lateral edge of the write gap in microns, wherein the lateral edge corresponds to a part of the corresponding magnetic write transducer that is used to record data, and wherein the ordinate-axis represents a magnetic flux density in Tesla.

Therein, FIG. 7 shows a graph 60 representing the relationship between the lateral position along the write gap and the magnetic flux density, respectively pairs of a lateral positions and corresponding values of the magnetic flux density for a magnetic write transducer with a write gap that has a uniform length in its cross-track direction.

FIG. 7 further shows a graph 61 representing the relationship between the lateral position along the write gap and the magnetic flux density, respectively pairs of a lateral positions and corresponding values of the magnetic flux density for a magnetic write transducer with a write gap that has a varying length in its cross-track direction, respectively wherein a longitudinal axis is defined between opposite ends of the write gap, wherein a length of the write gap along the longitudinal axis varies in a direction transverse to the longitudinal axis, and wherein a portion of the write gap at the lateral edge of the magnetic write transducer, respectively a shingling edge has the smallest length in the write gap, wherein the smallest length is a predetermined length that is less than any other length in the write gap.

In the example shown in FIG. 7, graph 60 represents pairs of a lateral positions and corresponding values of the magnetic flux density for a magnetic write transducer with a write gap that has a uniform length in its cross-track direction, in particular a uniform length equal to the shortest length of the write gap represented in graph 61.

As can be seen in FIG. 7, respectively when comparing graphs 60 and 61, there is an enhancement of the magnetic flux density in the narrow-gap edge region, respectively the lateral edge region with the smallest length in the write gap, and there is a decrease of the flux density in the middle region of the write gap with varying length in the direction transverse to the longitudinal axis that has a longer length than the narrow-gap region.

In particular, according to the example shown in FIG. 7 by correspondingly varying the length of the write gap, the flux through the write poles can be channeled at the edge of the writer at which the write gap has the smallest length in the direction transverse to the longitudinal axis, whereby hysteric domain motion processes may be better overcome and a smoother, polarity-symmetric, and more reproducible magnetic switching during bipolar switching at this location may be promoted.

Figure 8:
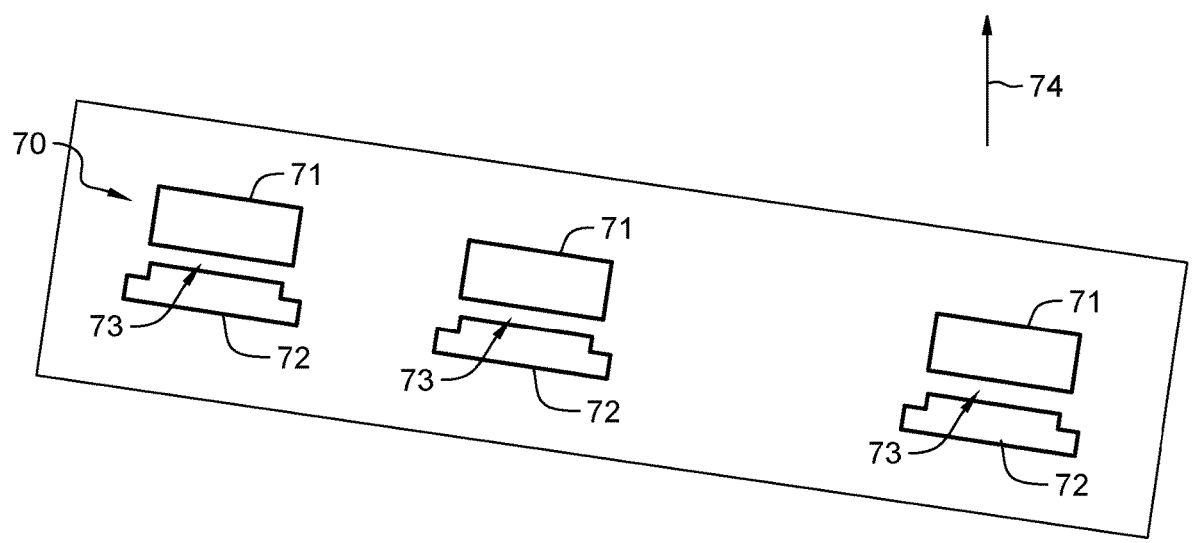
FIG. 8 illustrates a magnetic write head including several magnetic write transducers.

FIG. 8 illustrates a magnetic write head 70 including several magnetic write transducers 71.

In particular, FIG. 8 illustrates a magnetic write head 70 in which several magnetic write transducers 71 are embedded, wherein such a magnetic write head usually includes a linear array of 32 transducers.

Each of the magnetic write transducers 71 has a tape bearing surface 72, respectively a surface facing and in near contact with a sheet of magnetic media, for example a sheet of magnetic media coated on a tape. In particular, the magnetic write transducers 71 are arranged in such a way, that the poles of the magnetic write transducers are essentially flush with a tape bearing surface of the write head 70.

When recording data on the magnetic media, writing of the data can take place near a write gap 73 formed between the poles of a magnetic write transducer 71. As the magnetic tape advances, a track of written data is formed.

For the purpose of span adjustment, a longitudinal axis respectively formed between opposite ends of the write gaps 73 of the magnetic write transducers 71 can further be rotated about a normal to the tape bearing surface 72 to form an angle relative to an intended direction of travel of the magnetic tape 74. Therein, the angle can be between greater than 0.2° and about 15°.

It will be clear that the various features of the foregoing systems and/or methodologies may be combined in any way, creating a plurality of combinations from the descriptions presented above.

While various examples have been described above, it should be understood that they have been presented by way of example only, and not limitation. Thus, the breadth and scope of an example of the present invention should not be limited by any of the above-described exemplary examples but should be defined only in accordance with the following claims and their equivalents.

The description, provided herein, is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A magnetic write transducer for recording data on a magnetic media, the magnetic write transducer comprising:
   a first pole piece;
   a second pole piece; and
   a write gap defined between the first pole piece and the second pole piece, wherein the write gap is subdivided into at least two width portions of constant length, and wherein the second pole piece defines a planar surface facing the at least two width portions of constant length, and wherein the first pole piece is designed in such a way that a central portion of the write gap is widened compared to lateral portions of the write gap, wherein each lateral portion of the write gap defines a first gap length and the central portion of the write gap defines a second gap length greater than the first gap length, and wherein the write gap gradually decreases in length from the central portion of the write gap to at least one of the lateral portions along an inclined surface defined by the first pole piece.

2. The magnetic write transducer according to claim 1, wherein the length of the write gap varies in a direction transverse to a longitudinal axis by at least 10%.

3. The magnetic write transducer according to claim 2, wherein the length of the write gap varies in the direction transverse to the longitudinal axis by 20% to 100%.

4. The magnetic write transducer according to claim 1, wherein at least a portion of the write gap which has the smallest length is located at a lateral edge of at least one of the first and second pole pieces.

5. The magnetic write transducer according to claim 4, wherein a width of the central portion of the write gap is set based on a targeted operating track pitch.

6. The magnetic write transducer according to claim 5, wherein the width of the central portion corresponds to between approximately one and five times the targeted operating track pitch.

7. The magnetic write transducer according to claim 1, wherein the write transducer further has a tape bearing surface, and wherein a longitudinal axis is rotated about a normal to the tape bearing surface to form an angle relative to an intended direction of travel of the magnetic media.

8. The magnetic write transducer according to claim 1, wherein the first pole piece and the second pole piece comprise a tape bearing surface comprising a first edge oriented perpendicular to an intended direction of tape travel thereacross.

9. A longitudinal magnetic recording system for recording data on a magnetic tape, the longitudinal magnetic recording system comprising:
   a magnetic media; and at least one magnetic write transducer for recording data on the magnetic media, wherein the at least one magnetic write transducer comprises:

a first pole piece;

a second pole piece; and a write gap defined between the first pole piece and the second pole piece, wherein the write gap is subdivided into at least two width portions of constant length, and wherein the second pole piece defines a planar surface facing the at least two width portions of constant length, and wherein the first pole piece is designed in such a way that a central portion of the write gap is widened compared to lateral portions of the write gap, wherein each lateral portion of the write gap defines a first gap length and the central portion of the write gap defines a second gap length greater than the first gap length, and wherein the write gap gradually decreases in length from the central portion of the write gap to at least one of the lateral portions along an inclined surface defined by the first pole piece.

10. The longitudinal magnetic recording system according to claim 9, wherein the length of the write gap varies in a direction transverse to a longitudinal axis by at least 10%.

11. The longitudinal magnetic recording system according to claim 10, wherein the length of the write gap varies in the direction transverse to the longitudinal axis by 20% to 100%.

12. The longitudinal magnetic recording system according to claim 9, wherein at least a portion of the write gap which has the smallest length is located at a lateral edge of at least one of the first and second pole pieces.

13. The longitudinal magnetic recording system according to claim 12, wherein a width of the central portion is set based on a targeted operating track pitch.

14. The longitudinal magnetic recording system according to claim 13, wherein the width of the central portion corresponds to between approximately one and five times the targeted operating track pitch.

15. The longitudinal magnetic recording system according to claim 9, wherein the write transducer further has a tape bearing surface, and wherein the longitudinal axis is rotated about a normal to the tape bearing surface to form an angle relative to an intended direction of travel of the magnetic media.

16. The longitudinal magnetic recording system according to claim 9, wherein the first pole piece and the second pole piece comprise a tape bearing surface comprising a first edge oriented perpendicular to an intended direction of tape travel thereacross.

* * * * *